United States Patent [19]

Rudhart et al.

[11] 4,260,266

[45] Apr. 7, 1981

[54] MIX HEAD FOR THE PRODUCTION OF A FOAMABLE REACTION MIXTURE FROM FLUID COMPONENTS

[75] Inventors: Rudolf Rudhart; Klaus Schulte, both of Leverkusen; Werner Dietrich; Heinz Decker, both of Cologne, all of Fed. Rep. of Germany

[73] Assignee: Bayer Aktiengesellschaft, Leverkusen, Fed. Rep. of Germany

[21] Appl. No.: 45,884

[22] Filed: Jun. 6, 1979

[30] Foreign Application Priority Data

Jun. 29, 1978 [DE] Fed. Rep. of Germany ....... 2828505

[51] Int. Cl.³ .......................... B01F 5/06; B01F 15/02
[52] U.S. Cl. .................................... 366/336; 137/597; 366/150; 422/133
[58] Field of Search ............... 366/336, 337, 338, 339, 366/340, 150, 341, 184; 422/133; 137/597

[56] References Cited

U.S. PATENT DOCUMENTS

| | | | |
|---|---|---|---|
| 2,504,678 | 4/1950 | Gardner | 366/336 X |
| 2,990,252 | 6/1961 | Geldern | 422/133 X |
| 4,213,936 | 7/1980 | Lodrick | 422/133 |

FOREIGN PATENT DOCUMENTS 2742018  3/1979  Fed. Rep. of Germany ........... 366/150

*Primary Examiner*—Edward J. McCarthy
*Attorney, Agent, or Firm*—Gene Harsh; Joseph C. Gil; Lyndanne M. Whalen

[57] ABSTRACT

The invention relates to a mix head for the production of a foamable reaction mixture, preferably one forming polyurethane, from fluid components, said mixing head having a distributor member with several outlets attached to the outlet of the mixing chamber.

4 Claims, 1 Drawing Figure

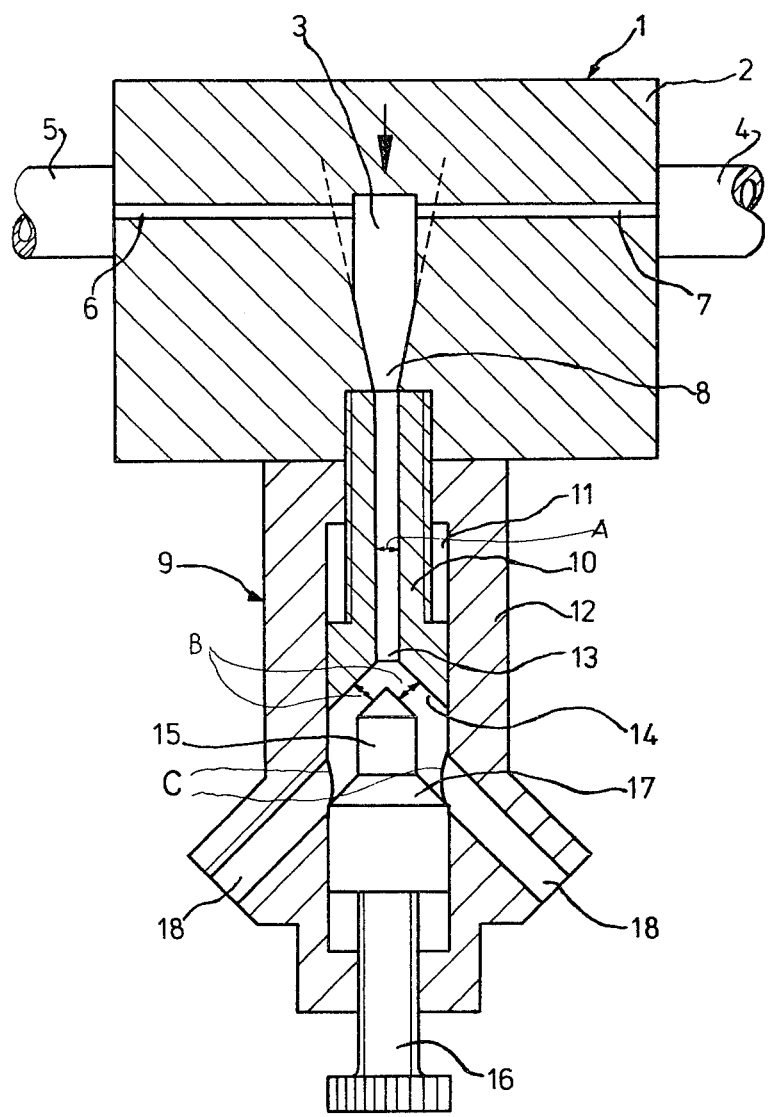

MIX HEAD FOR THE PRODUCTION OF A FOAMABLE REACTION MIXTURE FROM FLUID COMPONENTS

BACKGROUND OF THE INVENTION

In facilities for the continuous production of foam blocks of substantial width, it is known to attach a distributor member branching into a plurality of outlet pipes to the outlet of the mixing chamber. This distributor member is known in the art as an "antler". While this arrangement enables considerable quantities of mixture to be passed through per unit time due to the large cross sectional area available, there are generally no difficulties in the distribution of the mixture. In particular, exact quantitative distribution to the various outlet pipes is unimportant because the fluid mixture automatically becomes uniformly distributed on the inclined plane of the conveyor belt of the foaming installation.

It is also known to provide a distributor pipe system for the introduction of reaction mixture into very irregularly formed cavities enclosed by the two shells used for the manufacture of a bottom unit in motor vehicles so that the mixture can enter and flow uniformly to every point within the cavity. This distributor member can be connected to a mixing head on the outside. It is preferably constructed to serve also as reinforcing element for the surface shells.

Finally, in mixing heads which are combined with molding tools, it is known to sub-divide the sprue channel, by the usual method of extrusion and casting technology, into distributor channels which lead to the individual molding units.

With none of the known apparatus, however, is it possible to supply very small quantities of mixture to cavities, particularly open cavities.

When it is required to fill hollow building blocks with foam, for example, it is necessary to introduce relatively small quantities of mixture per unit time into the cavities. These quantities may vary from 10 to 100 g, according to the size of the cavity which is to be filled. The smallest foaming machines generally available on the market provide for a minimum feed time, generally known as shot time, of 0.5 seconds. If this is based on a quantity of mixture of 10 g, the total quantity ejected is 1200 g per minute. If, furthermore, it is assumed that the polyol and isocyanate components are used in the ratio of 1:1, the output of each pump is 600 g per minute. Such small quantities are difficult to control because of the difficulty of metering such quantities and especially because the forerun and afterflow adjustment is extremely troublesome. With a total shot time of 0.5 seconds, a forerun and afterflow even of only a few hundredths of a second are a considerable disadvantage.

The problem to be solved consists of finding a mixing head which can be used to introduce minute quantities of mixture into cavities.

BRIEF DESCRIPTION OF THE DRAWING

The FIGURE represents a mix head of the present invention.

DESCRIPTION OF THE INVENTION

To solve these problems, the distributor member of the present invention consists of a housing enclosing a central chamber in which a connecting pipe is longitudinally displaceable. Several outflow bores are arranged behind the outlet end of the connecting pipe in the housing. A distributor cone mounted on a set screw is provided opposite the outlet end of the outflow pipe.

Due to this arrangement, the mixture leaving the mixing chamber through the connecting pipe is evenly distributed to the various outflow bores by the distributor cone of the set screw. Due to the adjustability of the cone, the flow conditions can be so faborably adjusted that the formation of deposits which could eventually block the distributor member is substantially prevented.

The outlet end of the outflow pipe is preferably sloped at an angle equal to that of the distributor cone. This measure serves to prevent dead spaces and promotes flow.

According to another special embodiment, the distributor cone has a step which serves to improve the distribution of mixture to the individual outflow bores.

The outflow bores are preferably arranged parallel to the slope of the distributor cone. This measure also promotes flow in the desired direction.

An embodiment is illustrated by way of example in the drawing, in which the mixing head proper has only been indicated while the distributor member according to the invention is schematically represented in section and described below.

The mixing head 1 consists of a housing 2 enclosing a mixing chamber 3 which communicates with the feed pipes 4, 5 for the components through bores 6, 7. A distributor member 9 with connecting pipe 10 is attached to the outlet 8 of the mixing chamber 3. The said connecting pipe 10 is longitudinally displaceable in a central chamber 11 of a housing 12. Its outlet end 13 has a sloping surface 14 which faces a distributor cone 15 mounted on a set screw 16. The distributor cone 15 has a step 17. Inside the housing are outlet bores 18 designed to be attached to outlet pipes (not shown) which are directed towards the cavities to be filled.

EXAMPLE

The continuous stream of mixture arriving from the mixing chamber in an amount of about 1,200 g/min is divided into four equal and separated streams. In order to ensure a sufficient homogeneity of the mixture, it is known that a specific pressure must be present within the mixing chamber. This pressure is determined by means of an apertured partition. A theoretical velocity of more than 10 m/sec in the area of the apertured partition (cross-section A) would guarantee acceptable mixing. The velocity of the flow of the reaction mixture has to be continuously reduced at this point without dead spaces or whirls being formed. In the area of the cross-section B, the velocity is reduced e.g. from 4.0 to about 0.6 m/sec. In cross-section C of the ring gap, the velocity is about 0.3 m/sec. In order to achieve an equal division of the inflowing stream of mixture into the four outlet bores, the cross-sections A, B, C must always be filled up with mixture. For this reason, the velocity in the outlet bores is increased about, f.e. 0.5 m/sec. After this, a laminar flow of 0.4 m/sec is present in the four outlet bores. This method is not dependent on the viscosity of the mixture. The only condition which must be considered is that the decrease of velocity and the throttle effect are in the correct proportion to each other.

What is claimed is:

1. A mix head for the production of a foamable reaction mixture from fluid components, comprising a mixing chamber communicating with feed pipes for the fluid components, a distributor member with a plurality of outlets attached to the outlet of said mixing chamber, said distributor member consisting of a housing enclosing a central chamber in which a connecting pipe is longitudinally displaceable, outlet bores being arranged inside said housing behind the outlet end of the connecting pipe, and a distributor cone mounted on a set screw provided opposite the outlet end of said outlet pipe.

2. The mix head of claim 1, characterized in that the outlet end of said connecting pipe has a sloping surface conforming to the surface of said distributor cone.

3. The mix head of claim 1, characterized in that said distributor cone has a step.

4. The mix head of claim 1, characterized in that the outlet bores are directed parallel to the sloping surface of the distributor cone.

* * * * *